United States Patent [19]

Webb et al.

[11] Patent Number: 4,491,971
[45] Date of Patent: Jan. 1, 1985

[54] SHORT RANGE TRAPPED MINER LOCATOR

[75] Inventors: William E. Webb, Tuscaloosa; Ronald H. Church, Birmingham, both of Ala.

[73] Assignee: The United States of America as represented by the Secretary of the Interior, Washington, D.C.

[21] Appl. No.: 473,298

[22] Filed: Mar. 8, 1983

[51] Int. Cl.³ .......................................... H04B 1/034
[52] U.S. Cl. .................................. 455/100; 455/127; 340/539; 340/636; 340/663
[58] Field of Search .................. 455/89, 95, 99, 100, 455/128, 129; 340/539, 636, 663

[56] References Cited

U.S. PATENT DOCUMENTS

| | | | |
|---|---|---|---|
| 2,535,063 | 12/1950 | Halstead | 455/270 |
| 3,087,117 | 4/1963 | Mitchell | 455/128 |
| 3,181,135 | 4/1965 | Zoglio | 455/99 |
| 3,315,263 | 4/1967 | Lefevre | 455/89 |
| 3,750,023 | 7/1973 | Weissenborn et al. | 455/100 |
| 3,806,936 | 4/1974 | Koster | 455/100 |
| 4,296,408 | 10/1981 | Neuringer | 455/95 |

OTHER PUBLICATIONS

"A Short-Range Locator System for Detecting Trapped Miners", by Webb et al., Bureau of Mines Report of Investigations/1984.

Primary Examiner—Jin F. Ng
Attorney, Agent, or Firm—Thomas Zack; Donald A. Gardiner, Jr.

[57] ABSTRACT

A short range, low power, radio wave transmitter which acts as a miner locator. The transmitter is incorporated with the cap lamp circuitry for the miner. It utilizes the same self-contained power source and its wire connection thereto acts as the transmitter's antenna. No action on the miner's part is necessary in order to begin the transmission which may be on a specific identifying frequency for each miner. An electronic crowbar circuit may be used to conserve power for the transmitter by cutting off power to the cap lamp should the voltage across the self-contained power source fall below a preset level. This enables the transmitter to function for several days by reducing the load on the power source.

4 Claims, 1 Drawing Figure

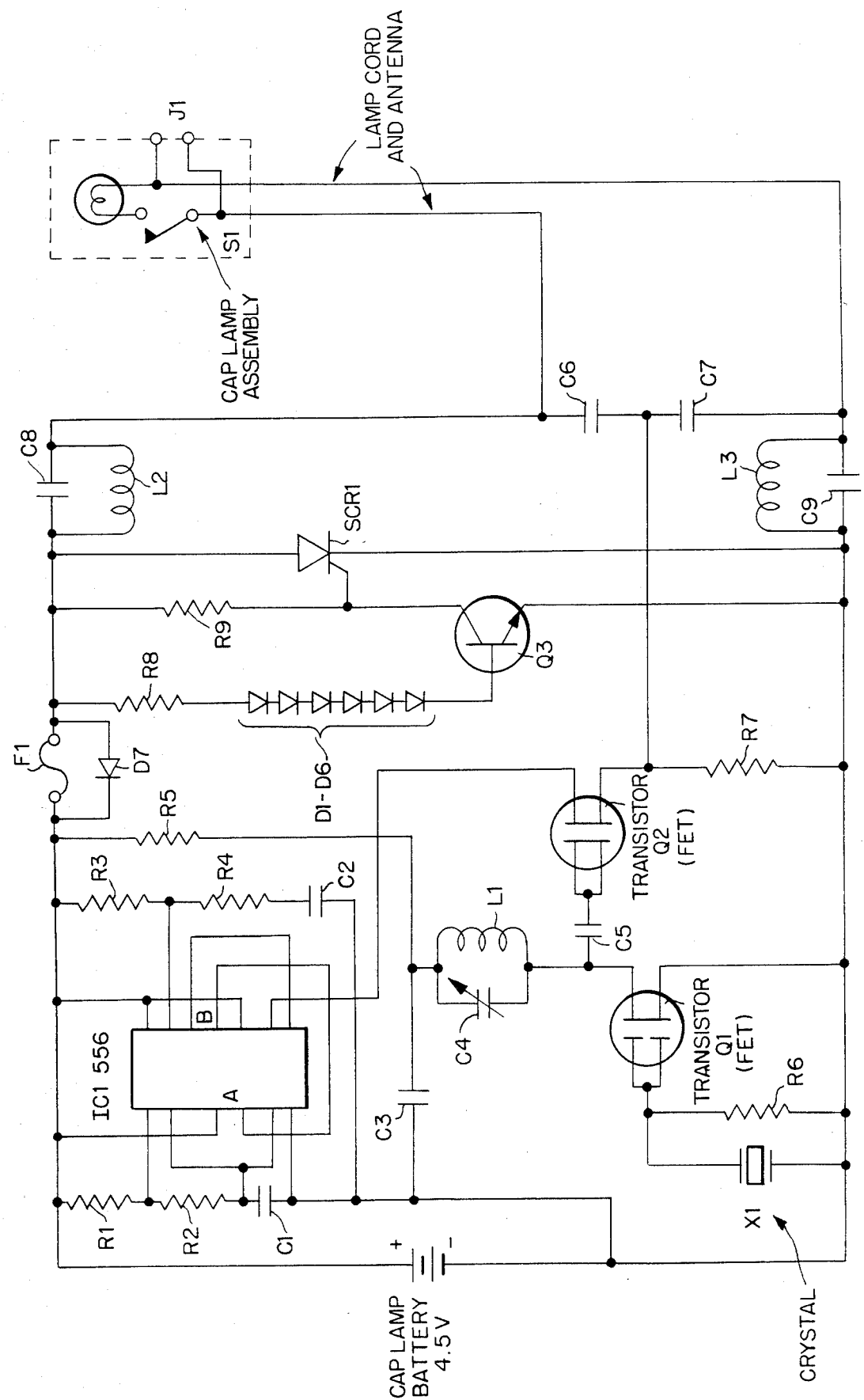

SHORT RANGE TRAPPED MINER LOCATOR

BACKGROUND OF THE INVENTION

The invention disclosed herein is a short range transmitter which allows miners to be individually located.

DESCRIPTION OF THE PRIOR ART

Underground transmitters for locating trapped miners are known in the art. In many cases, these transmitters are with the miners and underground to transmit signals to receivers located on the surface. One example of such a system can be found in U.S. Pat. No. 4,090,135 (A. J. Farstad et al) wherein short bursts of frequency shift keying digit data with a prior receiver alert code are both transmitted and received. In contrast to the typical prior art transmitter, we have designed and developed a low power transmitter which is powered by and incorporated into the miner's cap lamp battery. The wire from the miner's battery serves the dual function of a power conduit for the lamp and an antenna for the transmitter. Selective use of multiple or different transmitted frequencies allow differentiation to take place to locate trapped miners. When miners are trapped after a mine disaster, our invention has several distinct advantages over the prior art transmitters. First, due to its simple and compact design employing the lamp's power source and wire conduit antenna, it is much more likely to be with the miner. It provides a precise location for the miner by transmitting a personal short range beacon. Also, no action on the miner's part—who may be dead, severely injured, etc.—is necessary to initiate the transmission of the signal. Other advantages will also be very apparent after considering the following descriptive matter.

SUMMARY OF THE INVENTION

A low power transmitter which is incorporated into a miner's cap lamp and powered by the same battery. Electronic circuitry having a low power oscillator and modulation circuit continuously transmits a signal via the miner's battery/lamp line—which also acts as an antenna—to provide a homing beacon. When the power of the battery falls below a preset level, the current to the lamp is shut off to allow the transmitter to operate for a longer time.

DESCRIPTION OF THE DRAWINGS

The FIGURE illustrates the preferred embodiment of the circuitry for our invention.

DESCRIPTION OF THE PREFERRED EMBODIMENT

A typical electrical circuit which constitutes the preferred embodiment of the transmitter of our invention is shown in the FIGURE. Before, discussing its details and operation, it should be clear that certain functions and elements of our invention are critical while others are variable and optional. What features and elements our invention must have to operate and perform as we envision are: a low power source which is the same as that used to provide power to the miner's lamp; a transmitting antenna which is coextensive with the line providing power to the miner's lamp; and an oscillator and modulator circuit to transmit, via the line antenna, a modulated radio frequency signal. The exact details of the circuitry and optional features of the circuitry may vary.

Our short range transmitter or miner locator is incorporated into the same housing as that of the miner's cap lamp battery. In this way it is compact in design, easy to carry, and there is very little likelihood it will be forgotten by a miner during a typical work day. Normally, the battery's housing is clipped to the miner's belt with an electrical line extending therefrom to the miner's cap and lamp. This same line or lamp cord acts as the antenna and is depicted and labelled as such in the FIGURE.

Also shown in the preferred embodiment FIGURE is the crystal controlled oscillator (FET $Q_1$) and associated components made up of resistor $R_6$, piezoelectric crystal $X_1$, capacitor $C_4$, inductor $L_1$, and a source follower amplifier (FET $Q_2$). Typically the oscillator would be operating at a frequency near 27 megahertz (MHz) to provide a high frequency signal. The signal from the oscillator is amplitude modulated by the 556 timer (ICI 556) which consists of a series of audio pulses or beeps. The actual frequency of the tone is determined by the values of the of the resistors $R_3$ and $R_4$ and the capacitor $C_2$. The pulse repetition rate (prf) is determined by the values of the resistors $R_1$ and $R_2$ and the capacitor $C_1$. For example, a more or less typical prf could be 4 or 5 pulses per second. The two parallel resonant circuits formed by inductances $L_2/L_3$ and capacitor $C_8/C_9$, respectively, electronically isolate the antenna at radio frequencies.

The circuit components made up of transistor $Q_3$ silicon controlled rectifier SCR 1, resistors $R_9$ and $R_8$, fuse $F_1$, and the diode chain $D_1$ to $D_7$ are an electronic crowbar. This crowbar functions, inter alia, to conserve the battery power for operating the transmitter when the cap lamp battery is near the end of its useful life. Assuming that, as is the case in our preferred embodiment, the battery is rated at 4.5 volts (v). When, for example, the terminal voltage across transistor $Q_3$ is above 3.5 volts, the transistor is saturated and its collector voltage will be near zero. In such a case when the voltage falls below 3.5 volts, the transistor will cut off causing its collector voltage to rise. This event causes SCR 1 to fire and the fuse $F_1$ to blow which thereby cuts current to the lamp while still powering the transmitter. With the load on the cap lamp removed, the battery voltage supplied to the new load will rise to approximately 4 volts. There is then sufficient capacity remaining within the battery to power the transmitter for several days. If it is desired to change the aforesaid triggering function from the 3.5 volt level, then the number of diodes in the diode chain $D_1$-$D_7$ can be changed. The preselected triggering level is selected by taking a value which corresponds to the end of the useful life for the cap lamp. In this way, only a few minutes of cap lamp light are traded off against several days of homing signal transmissions.

We anticipate that each miner will carry a personal locator transmitter embodying our invention. Following a mine disaster, rescue personnel would use a receiver with a conventional directional antenna, such as a loop antenna, to locate miners trapped behind roof falls or sealed off areas or to find their bodies under roof falls. Two or more frequencies could be used. One would be a standard frequency used by all workers and the other an alternate frequency carried by the rescue team. This multiple frequency characteristic would prevent interference occurring from the rescue personnel's own units. Depending on the make up of the earth, its moisture content, and other variable, each transmitter should be able to send a homing signal up to 500 feet in all directions.

Variations for the disclosed electronic circuitry are possible. For example, one or more reverse biased zener diodes can be used in place of the diode chain $D_1$–$D_7$; or a programmable shift register could be inserted between pins A and B or the ICI to allow unique locating codes for each transmitter. None of these or other possible changes should be used to change the scope and spirit of our invention which is to be limited only by the claims which follow.

We claim:

1. A personal locator transmitter in combination with a miner's cap lamp comprising:
   a common self-contained portable power source means to provide electrical power to both the transmitter and the miner's cap lamp, said cap lamp being located in a miner's cap adapted to be worn on the head of a miner, said power source means and said transmitter being located in a housing spaced from the miner's cap and being adapted to be secured to the body of a miner;
   said cap lamp being electrically connected to said power source means by a wire which provides power to the lamp and also functions as a transmitting antenna for the transmitter; and
   said transmitter being a portable lower power transmitter having an oscillator and modulator circuit it output a high fixed frequency radio wave signal from said wire antenna.

2. The combination of claim 1 wherein said transmitter also comprises an electronic crowbar circuit to cut off electrical power to the cap lamp should the power output from the power source means fall below some preestablished level, said power available to the transmitted being increased as a result thereof.

3. The combination of claim 1 wherein said transmitter includes a silicon controlled rectified switch and diode chain for electrically cutting off power to said cap lamp should the power from the power source means fall below a preselected level; said power available to the transmitter being increased as a result thereof.

4. The combination of claim 1 also including timing circuitry to amplitude modulate the radio signal from the transmitter.

* * * * *